(12) United States Patent
Gray

(10) Patent No.: US 8,115,745 B2
(45) Date of Patent: *Feb. 14, 2012

(54) APPARATUS AND METHOD FOR INTERACTIVE DISPLAY WITH TACTILE FEEDBACK

(75) Inventor: R. O'Neal Gray, Dallas, TX (US)

(73) Assignee: Tactile Displays, LLC, Dallas, TX (US)

( * ) Notice: Subject to any disclaimer, the term of this patent is extended or adjusted under 35 U.S.C. 154(b) by 585 days.

This patent is subject to a terminal disclaimer.

(21) Appl. No.: 12/339,721

(22) Filed: Dec. 19, 2008

(65) Prior Publication Data

US 2009/0315832 A1 Dec. 24, 2009

Related U.S. Application Data

(63) Continuation-in-part of application No. 12/142,624, filed on Jun. 19, 2008.

(51) Int. Cl.
*G06F 3/041* (2006.01)

(52) U.S. Cl. .......................... 345/173; 345/168

(58) Field of Classification Search .................. None
See application file for complete search history.

(56) References Cited

U.S. PATENT DOCUMENTS

| | | | |
|---|---|---|---|
| 3,333,160 A | 7/1967 | Gorski | |
| 3,541,541 A | 11/1970 | Englebart | |
| 3,641,568 A * | 2/1972 | Brescia et al. | 341/32 |
| 3,662,105 A | 5/1972 | Hurst et al. | 178/18 |
| 3,798,370 A | 3/1974 | Hurst | 178/18 |
| 3,995,126 A | 11/1976 | Larson | |
| 4,127,752 A | 11/1978 | Lowthorp | |
| 4,194,097 A | 3/1980 | Bradam | |
| 4,246,452 A | 1/1981 | Chandler | 200/5 |
| 4,507,651 A * | 3/1985 | Boll et al. | 341/32 |
| 4,508,942 A | 4/1985 | Inaba | |
| 4,550,221 A | 10/1985 | Mabusth | 178/18 |
| 4,672,364 A | 6/1987 | Lucas | 340/365 P |
| 4,672,558 A | 6/1987 | Beckes et al. | 364/518 |
| 4,692,809 A | 9/1987 | Beining et al. | 358/247 |

(Continued)

FOREIGN PATENT DOCUMENTS

CA 1243096 10/1988 .................. 340/180

(Continued)

OTHER PUBLICATIONS

International Search Report mailed Jan. 2, 2008, for PCT Application No. PCT/US2007/066022, filed Apr. 5, 2007, three pages.

(Continued)

*Primary Examiner* — Jason Olson
(74) *Attorney, Agent, or Firm* — Amster, Rothstein & Ebenstein LLP

(57) ABSTRACT

An electronic device including an interactive display having an interactive mode and a non-interactive mode. The interactive display includes an image display device that displays a user-interactive imaged keypad in at least a portion of the image display device when the interactive display is in the interactive mode and that displays other image data in the at least a portion of the image display device when the interactive display is in the non-interactive mode, and a substantially transparent physical keypad that provides tactile feedback to a user indicating location of one or more imaged keys within the imaged keypad in response to one or more actuators disposed below the image display device.

14 Claims, 12 Drawing Sheets

U.S. PATENT DOCUMENTS

| | | | |
|---|---|---|---|
| 4,695,827 A | 9/1987 | Beining et al. .............. 340/365 P |
| 4,707,570 A | 11/1987 | Ide et al. | |
| 4,733,222 A | 3/1988 | Evans ........................ 340/365 C |
| 4,734,685 A | 3/1988 | Watanabe ...................... 340/710 |
| 4,746,770 A | 5/1988 | McAvinney ..................... 178/18 |
| 4,771,276 A | 9/1988 | Parks .......................... 340/712 |
| 4,788,384 A | 11/1988 | Bruere-Dawson et al. ..... 178/18 |
| 4,806,846 A | 2/1989 | Kerber ....................... 324/60 CD |
| 4,898,555 A | 2/1990 | Sampson ........................ 445/22 |
| 4,940,346 A | 7/1990 | Liljenquist | |
| 4,968,877 A | 11/1990 | McAvinney et al. ........ 250/221 |
| 4,990,900 A | 2/1991 | Kikuchi | |
| 5,003,519 A | 3/1991 | Noirjean ........................ 368/73 |
| 5,017,030 A | 5/1991 | Crews .......................... 400/485 |
| 5,178,477 A | 1/1993 | Gambaro ....................... 400/489 |
| 5,189,403 A | 2/1993 | Franz et al. ................... 340/711 |
| 5,194,862 A | 3/1993 | Edwards ........................ 341/20 |
| 5,224,861 A | 7/1993 | Glass et al. .................... 434/35 |
| 5,241,308 A | 8/1993 | Young .......................... 341/34 |
| 5,252,951 A | 10/1993 | Tannenbaum et al. ........ 345/156 |
| 5,281,966 A | 1/1994 | Walsh .......................... 341/22 |
| 5,305,017 A | 4/1994 | Gerpheide .................... 345/174 |
| 5,311,175 A | 5/1994 | Waldman | |
| 5,345,543 A | 9/1994 | Capps et al. .................. 395/137 |
| 5,376,948 A | 12/1994 | Roberts ........................ 345/173 |
| 5,379,057 A | 1/1995 | Clough et al. | |
| 5,398,310 A | 3/1995 | Tchao et al. ................... 395/144 |
| 5,412,189 A | 5/1995 | Cragun | |
| 5,442,742 A | 8/1995 | Greyson et al. ............... 395/146 |
| 5,463,388 A | 10/1995 | Boie et al. ...................... 341/33 |
| 5,463,696 A | 10/1995 | Beernink et al. ............... 382/186 |
| 5,483,261 A | 1/1996 | Yasutake ...................... 345/173 |
| 5,488,204 A | 1/1996 | Mead et al. ................... 178/18 |
| 5,495,077 A | 2/1996 | Miller et al. ................... 178/18 |
| 5,513,309 A | 4/1996 | Meier et al. ................... 395/155 |
| 5,523,775 A | 6/1996 | Capps .......................... 345/179 |
| 5,530,455 A | 6/1996 | Gillick et al. ................... 345/163 |
| 5,543,590 A | 8/1996 | Gillespie et al. ............... 178/18 |
| 5,543,591 A | 8/1996 | Gillespie et al. ............... 178/18 |
| 5,563,632 A | 10/1996 | Roberts ........................ 345/173 |
| 5,563,996 A | 10/1996 | Tchao .......................... 395/144 |
| 5,565,658 A | 10/1996 | Gerpheide et al. ............. 178/19 |
| 5,579,036 A | 11/1996 | Yates, IV ..................... 345/173 |
| 5,581,681 A | 12/1996 | Tchao et al. ................... 395/804 |
| 5,583,946 A | 12/1996 | Gourdol ........................ 382/187 |
| 5,590,219 A | 12/1996 | Gourdol ........................ 382/202 |
| 5,592,566 A | 1/1997 | Pagallo et al. ................. 382/187 |
| 5,594,810 A | 1/1997 | Gourdol ........................ 382/187 |
| 5,596,694 A | 1/1997 | Capps .......................... 395/152 |
| 5,612,719 A | 3/1997 | Beernink et al. ............... 345/173 |
| 5,631,805 A | 5/1997 | Bonsall ........................ 361/681 |
| 5,633,955 A | 5/1997 | Bozinovic et al. ............. 381/187 |
| 5,634,102 A | 5/1997 | Capps .......................... 395/334 |
| 5,635,958 A | 6/1997 | Murai et al. | |
| 5,636,101 A | 6/1997 | Bonsall et al. ................ 361/681 |
| 5,642,108 A | 6/1997 | Gopher et al. ................. 341/22 |
| 5,644,657 A | 7/1997 | Capps et al. .................. 382/229 |
| 5,666,113 A | 9/1997 | Logan .......................... 341/34 |
| 5,666,502 A | 9/1997 | Capps .......................... 345/352 |
| 5,666,552 A | 9/1997 | Greyson et al. ............... 395/802 |
| 5,675,361 A | 10/1997 | Santilli ........................ 345/168 |
| 5,675,362 A | 10/1997 | Clough et al. | |
| 5,677,710 A | 10/1997 | Thompson-Rohrlich ..... 345/173 |
| 5,689,253 A | 11/1997 | Hargreaves et al. ........... 341/22 |
| 5,710,844 A | 1/1998 | Capps et al. .................. 382/317 |
| 5,729,250 A | 3/1998 | Bishop et al. ................. 345/175 |
| 5,730,165 A | 3/1998 | Philipp .......................... 137/1 |
| 5,736,976 A | 4/1998 | Cheung ........................ 345/168 |
| 5,741,990 A | 4/1998 | Davies .......................... 84/423 R |
| 5,745,116 A | 4/1998 | Pisutha-Arnond ........... 345/358 |
| 5,745,716 A | 4/1998 | Tchao et al. ................... 395/350 |
| 5,746,818 A | 5/1998 | Yatake ...................... 106/31.86 |
| 5,748,269 A | 5/1998 | Harris et al. ................... 349/58 |
| 5,764,222 A | 6/1998 | Shieh .......................... 345/173 |
| 5,767,457 A | 6/1998 | Gerpheide et al. ............. 178/18 |
| 5,767,842 A | 6/1998 | Korth .......................... 345/168 |
| 5,790,104 A | 8/1998 | Shieh .......................... 345/173 |
| 5,790,107 A | 8/1998 | Kasser et al. .................. 342/174 |
| 5,802,516 A | 9/1998 | Shwarts et al. .................. 707/6 |
| 5,808,567 A | 9/1998 | McCloud ........................ 341/20 |
| 5,809,267 A | 9/1998 | Moran et al. ................... 395/358 |
| 5,821,690 A | 10/1998 | Martens et al. ............... 313/506 |
| 5,821,930 A | 10/1998 | Hansen .......................... 345/340 |
| 5,823,782 A | 10/1998 | Marcus et al. ................. 434/156 |
| 5,825,351 A | 10/1998 | Tam ............................. 345/173 |
| 5,825,352 A | 10/1998 | Bisset et al. ................... 345/173 |
| 5,835,080 A | 11/1998 | Beeteson et al. | |
| 5,838,138 A * | 11/1998 | Henty .......................... 320/107 |
| 5,854,625 A | 12/1998 | Frisch et al. ................... 345/173 |
| 5,880,411 A | 3/1999 | Gillespie et al. ........... 178/18.01 |
| 5,880,539 A * | 3/1999 | Chen .......................... 307/119 |
| 5,898,434 A | 4/1999 | Small et al. ................... 345/348 |
| 5,920,309 A | 7/1999 | Bisset et al. ................... 345/173 |
| 5,923,319 A | 7/1999 | Bishop et al. ................. 345/175 |
| 5,933,134 A | 8/1999 | Shieh .......................... 345/173 |
| 5,943,044 A | 8/1999 | Martinelli et al. ............. 345/174 |
| 6,002,389 A | 12/1999 | Kasser .......................... 345/173 |
| 6,002,808 A | 12/1999 | Freeman ....................... 382/288 |
| 6,020,881 A | 2/2000 | Naughton et al. ............. 345/327 |
| 6,031,524 A | 2/2000 | Kunert ........................ 345/173 |
| 6,037,882 A | 3/2000 | Levy ............................. 341/20 |
| 6,050,825 A | 4/2000 | Nichol et al. .................. 434/227 |
| 6,052,339 A | 4/2000 | Frenkel et al. ................. 368/230 |
| 6,072,494 A | 6/2000 | Nguyen ........................ 345/358 |
| 6,084,576 A | 7/2000 | Leu et al. ...................... 345/168 |
| 6,107,997 A | 8/2000 | Ure .............................. 345/173 |
| 6,128,003 A | 10/2000 | Smith et al. ................... 345/157 |
| 6,131,299 A | 10/2000 | Raab et al. .................... 33/503 |
| 6,135,958 A | 10/2000 | Mikula-Curtis et al. ...... 600/443 |
| 6,144,380 A | 11/2000 | Schwarts et al. .............. 345/350 |
| 6,188,391 B1 | 2/2001 | Seely et al. .................... 345/173 |
| 6,198,515 B1 | 3/2001 | Cole .............................. 348/836 |
| 6,208,329 B1 | 3/2001 | Ballare ........................ 345/173 |
| 6,222,465 B1 | 4/2001 | Kumar et al. .................. 341/20 |
| 6,239,790 B1 | 5/2001 | Martinelli et al. ............. 345/174 |
| 6,243,071 B1 | 6/2001 | Shwarts et al. ................ 345/146 |
| 6,246,862 B1 | 6/2001 | Grivas et al. .................. 455/90 |
| 6,249,606 B1 | 6/2001 | Kiraly et al. .................. 382/195 |
| 6,288,707 B1 | 9/2001 | Philipp .......................... 345/168 |
| 6,289,326 B1 | 9/2001 | LaFleur ........................ 705/702 |
| 6,292,178 B1 | 9/2001 | Bernstein et al. ............. 345/173 |
| 6,323,846 B1 | 11/2001 | Westerman et al. | |
| 6,323,849 B1 | 11/2001 | He et al. ........................ 345/173 |
| 6,347,290 B1 | 2/2002 | Bartlett ........................ 702/150 |
| 6,356,259 B1 | 3/2002 | Maeda et al. | |
| 6,377,009 B1 | 4/2002 | Philipp .......................... 318/468 |
| 6,380,931 B1 | 4/2002 | Gillespie et al. ............... 345/173 |
| 6,411,287 B1 | 6/2002 | Scharff et al. ................. 345/177 |
| 6,414,671 B1 | 7/2002 | Gillespie et al. ............... 345/157 |
| 6,421,234 B1 | 7/2002 | Ricks et al. .................... 361/683 |
| 6,429,846 B2 | 8/2002 | Rosenberg et al. | |
| 6,452,514 B1 | 9/2002 | Philipp .......................... 341/33 |
| 6,457,355 B1 | 10/2002 | Philipp .......................... 73/304 |
| 6,466,036 B1 | 10/2002 | Philipp .......................... 324/678 |
| 6,515,669 B1 | 2/2003 | Mohri ........................... 345/474 |
| 6,525,749 B1 | 2/2003 | Moran et al. ................... 345/863 |
| 6,535,200 B2 | 3/2003 | Philipp .......................... 345/168 |
| 6,543,684 B1 | 4/2003 | White et al. ................... 234/379 |
| 6,543,947 B2 | 4/2003 | Lee .............................. 400/489 |
| 6,570,557 B1 | 5/2003 | Westerman et al. ........... 345/173 |
| 6,593,916 B1 | 7/2003 | Aroyan ........................ 345/173 |
| 6,610,936 B2 | 8/2003 | Gillespie et al. ........... 178/18.01 |
| 6,624,833 B1 | 9/2003 | Kumar et al. .................. 345/863 |
| 6,639,577 B2 | 10/2003 | Eberhard ....................... 345/102 |
| 6,650,319 B1 | 11/2003 | Hurst et al. ................... 345/173 |
| 6,658,994 B1 | 12/2003 | McMillan ...................... 99/468 |
| 6,670,894 B2 | 12/2003 | Mehring ........................ 341/22 |
| 6,677,932 B1 | 1/2004 | Westerman ................... 345/173 |
| 6,677,934 B1 | 1/2004 | Blanchard ..................... 345/173 |
| 6,706,552 B2 | 3/2004 | Getz et al. | |
| 6,724,366 B2 | 4/2004 | Crawford ..................... 345/157 |
| 6,757,002 B1 | 6/2004 | Oross et al. ................... 345/864 |
| 6,803,906 B1 | 10/2004 | Morrison et al. ............. 345/173 |
| 6,822,635 B2 | 11/2004 | Shahoian et al. | |
| 6,842,672 B1 | 1/2005 | Straub et al. .................... 701/3 |
| 6,856,259 B1 | 2/2005 | Sharp ........................... 341/5 |
| 6,888,536 B2 | 5/2005 | Westerman et al. ........... 345/173 |

| | | | |
|---|---|---|---|
| 6,900,795 B1 | 5/2005 | Knight, III et al. | 345/173 |
| 6,927,761 B2 | 8/2005 | Badaye et al. | 345/173 |
| 6,942,571 B1 | 9/2005 | McAllister et al. | 463/20 |
| 6,965,375 B1 | 11/2005 | Gettemy et al. | 345/173 |
| 6,972,401 B2 | 12/2005 | Akitt et al. | 250/221 |
| 6,977,666 B1 | 12/2005 | Hedrick | 345/690 |
| 6,985,801 B1 | 1/2006 | Straub et al. | 701/3 |
| 6,992,659 B2 | 1/2006 | Gettemy | 345/173 |
| 7,031,228 B2 | 4/2006 | Born et al. | 368/69 |
| 7,148,875 B2 | 12/2006 | Rosenberg et al. | |
| 7,339,572 B2 | 3/2008 | Schena | |
| 7,748,634 B1 | 7/2010 | Zehr et al. | |
| 7,978,181 B2* | 7/2011 | Westerman | 345/173 |
| 2002/0118848 A1 | 8/2002 | Karpenstein | 381/119 |
| 2002/0149570 A1 | 10/2002 | Knowles et al. | |
| 2003/0006974 A1 | 1/2003 | Clough et al. | 345/179 |
| 2003/0076301 A1 | 4/2003 | Tsuk et al. | 345/159 |
| 2003/0076303 A1 | 4/2003 | Huppi | 345/163 |
| 2003/0076306 A1 | 4/2003 | Zadesky et al. | 345/173 |
| 2003/0095095 A1 | 5/2003 | Pihlaja | 345/156 |
| 2003/0095096 A1 | 5/2003 | Robbin et al. | 345/156 |
| 2003/0098858 A1 | 5/2003 | Perski et al. | 345/173 |
| 2003/0206202 A1 | 11/2003 | Moriya | 345/846 |
| 2003/0234768 A1 | 12/2003 | Rekimoto et al. | 345/169 |
| 2004/0229663 A1 | 11/2004 | Tosey et al. | |
| 2004/0263481 A1 | 12/2004 | Nishikawa et al. | |
| 2004/0263484 A1 | 12/2004 | Mantysalo et al. | 345/173 |
| 2005/0012723 A1 | 1/2005 | Pallakoff | 345/173 |
| 2005/0017947 A1 | 1/2005 | Shahoian et al. | |
| 2005/0030292 A1 | 2/2005 | Diederiks | |
| 2005/0052425 A1 | 3/2005 | Zadesky et al. | 345/173 |
| 2005/0052430 A1 | 3/2005 | Shahoian et al. | |
| 2005/0104867 A1 | 5/2005 | Westerman et al. | 345/173 |
| 2005/0110768 A1 | 5/2005 | Marriott et al. | 345/173 |
| 2005/0190159 A1 | 9/2005 | Skarine | |
| 2006/0022955 A1 | 2/2006 | Kennedy | 345/173 |
| 2006/0022956 A1 | 2/2006 | Lengeling et al. | 345/173 |
| 2006/0026521 A1 | 2/2006 | Hotelling et al. | 715/702 |
| 2006/0026535 A1 | 2/2006 | Hotelling et al. | 715/863 |
| 2006/0026536 A1 | 2/2006 | Hotelling et al. | 715/863 |
| 2006/0032680 A1 | 2/2006 | Elias et al. | 178/18.06 |
| 2006/0033724 A1 | 2/2006 | Chaudhri et al. | 345/173 |
| 2006/0053387 A1 | 3/2006 | Ording | 715/773 |
| 2006/0066582 A1 | 3/2006 | Lyon et al. | 345/173 |
| 2006/0085757 A1 | 4/2006 | Andre et al. | 715/771 |
| 2006/0097991 A1 | 5/2006 | Hotelling et al. | 345/173 |
| 2006/0119589 A1 | 6/2006 | Rosenberg et al. | |
| 2006/0187215 A1 | 8/2006 | Rosenberg et al. | |
| 2006/0192771 A1 | 8/2006 | Rosenberg et al. | |
| 2006/0197753 A1 | 9/2006 | Hotelling | 345/173 |
| 2007/0013677 A1 | 1/2007 | Rosenberg et al. | |
| 2007/0040815 A1 | 2/2007 | Rosenberg et al. | |
| 2007/0182718 A1 | 8/2007 | Schoener et al. | |
| 2007/0229478 A1 | 10/2007 | Rosenberg et al. | |
| 2008/0060856 A1 | 3/2008 | Shahoian et al. | |
| 2008/0062143 A1 | 3/2008 | Shahoian et al. | |
| 2008/0062144 A1 | 3/2008 | Shahoian et al. | |
| 2008/0062145 A1 | 3/2008 | Shahoian et al. | |
| 2008/0068348 A1 | 3/2008 | Rosenberg et al. | |
| 2008/0068349 A1 | 3/2008 | Rosenberg et al. | |
| 2008/0068350 A1 | 3/2008 | Rosenberg et al. | |
| 2008/0068351 A1 | 3/2008 | Rosenberg et al. | |
| 2008/0303796 A1* | 12/2008 | Fyke | 345/173 |
| 2009/0002205 A1 | 1/2009 | Klinghult et al. | |
| 2009/0002328 A1 | 1/2009 | Ullrich et al. | |
| 2009/0128503 A1* | 5/2009 | Grant et al. | 345/173 |
| 2009/0315830 A1 | 12/2009 | Westerman | |

FOREIGN PATENT DOCUMENTS

| | | |
|---|---|---|
| DE | 102 51 296 | 5/2004 |
| DE | 10324580 | 12/2004 |
| EP | 0 288 692 | 7/1993 |
| EP | 0 664 504 | 1/1995 |
| EP | 0 464 908 | 9/1996 |
| EP | 0915490 | 5/1999 |
| EP | 1 014 295 | 1/2002 |
| GB | 2009047 | 6/1979 |
| WO | 97/18547 | 5/1997 |
| WO | 97/23738 | 7/1997 |
| WO | 98/14863 | 4/1998 |
| WO | 9938149 | 7/1999 |
| WO | 03/088176 | 10/2003 |
| WO | 2004009488 | 12/2004 |
| WO | 2006/023569 | 3/2006 |
| WO | WO-2007/127585 A2 | 11/2007 |
| WO | WO-2007/127585 A3 | 11/2007 |

OTHER PUBLICATIONS

"Capacitive Position Sensing" obtained from http://www.synaptics.com/technology/cps.cfm generated Aug. 5, 2005.

"Comparing Touch Technologies" obained from http://www.touchscreens.com/intro-touchtypes.html generated Oct. 10, 2004.

"GlidePoint®" obained from http://www.cirque.com/technology/technology_gp.html generated Aug. 5, 2005.

"How do touchscreen know where you're touching?" obtained from http://www.electronics.howstuffworks.com/question716.html generated Aug. 5, 2005.

"How does a touchscreen work?" obained from http://www.touchscreens.com/intro-anatomy.html generated Aug. 5, 2005.

"iGesture Products for Everyone (learn in minutes) Product Overview" FingerWorks.com, Aug. 30, 2005.

"Infrared Touchscreens" obtained from http://www.touchscreens.com/intro-touchtypes-infrared.html generated Aug. 5, 2005.

"Mouse Emulation" FingerWorks obtained from http://www.fingerworks.com/gesture_guide_mouse.html generated Aug. 30, 2005.

"Mouse Gestures in Opera" obtained from http://www.opera.com/products/desktop/mouse/index.dml generated Aug. 30, 2005.

"Mouse Gestures," Optim oz, May 21, 2004.

"MultiTouch Overview" FingerWorks obtained from http://www.fingerworks.com/multoverview.html generated Aug. 30, 2005.

"Near Field Imaging Touchscreens" obtained from http://www.touchscreens.com/intro-touchtypes-nfi.html generated Aug. 5, 2005.

"PenTouch Capacitive Touchscreens" obtained from http://www.touchscreens.com/intro-touchtypes-pentouch.html generated Aug. 5, 2005.

"Surface Acoustic Wave Touchscreens" obained from http://www.touchscreens.com/intro-touchtypes-saw.html generated Aug. 5, 2005.

"Symbol Commander" obtained from http://www.sensiva.com/symbolcomander/, generated Aug. 30, 2005.

"Tips for Typing" FingerWorks http://www.fingerworks.com/mini_typing.html generated Aug. 30, 2005.

"Touch Technologies Overview" 2001, 3M Touch Systems, Massachusetts.

"Wacom Components—Technology" obtained from http://www.wacom-components.com/english/tech.asp generated on Oct. 10, 2004.

"Watershed Algorithm" http://rsb.info.nih.gov/ij/plugins/watershed.html generated Aug. 5, 2005.

"FingerWorks—Gesture Guide—Application Switching," obtained from http://www.fingerworks.com/gesture_guide_apps.html, generated on Aug. 27, 2004, 1-pg.

"FingerWorks—Gesture Guide—Editing," obtained from http://www.fingerworks.com/gesture_guide_editing.html, generated on Aug. 27, 2004, 1-pg.

"FingerWorks—Gesture Guide—File Operations," obtained from http://www.fingerworks.com/gesture_guide_files.html, generated on Aug. 27, 2004, 1-pg.

"FingerWorks—Gesture Guide—Text Manipulation," obtained from http://www.fingerworks.com/gesture_guide_text_manip.html, generated on Aug. 27, 2004, 2-pg.

"FingerWorks—Gesture Guide—Tips and Tricks," obtained from http://www.fingerworks.com/gesture_guide_tips.html, generated on Aug. 27, 2004, 2-pgs.

"FingerWorks—Gesture Guide—Web," obtained from http://www.fingerworks.com/gesture_guide_web.html, generated on Aug. 27, 2004, 1-pg.

"FingerWorks—Guide to Hand Gestures for USB Touchpads," obtained from http://www.fingerworks.com/igesture_userguide.html, generated Aug. 27, 2004, 1-pg.

"FingerWorks—iGesture—Technical Details," obtained from http://www.fingerworks.com/igesture_tech.html, generated Aug. 27, 2004, 1-pg.

"FingerWorks—The Only Touchpads with Ergonomic Full-Hand Resting and Relaxation!" obained from http://www.fingerworks.com/resting.html, Copyright 2001, 1-pg.

"FingerWorks—Tips for Typing on the Mini," obtained from http://www.fingerworks.com/mini_typing.html, generated on Aug. 27, 2004, 2-pgs.

"iGesture Pad—the MultiFinger USB TouchPad with Whole Hand Gestures," obtained from http://www.fingerworks.com/igesture.html, generated Aug. 27, 2004, 2-pgs.

Bier, et al., "Toolglass and Magic Lenses: The see-through interface" In James Kijiya, editor, Computer Graphics (SIGGRAPH '93 Proceedings), vol. 27, pp. 73-80, Aug. 1993.

Douglas et al., *The Ergonomics of Computer Pointing Devices* (1997).

European Search Report received in EP 1 621 989 (@ *Beyer Weaver & Thomas, LLP*) dated Mar. 27, 2006.

EVB Elektronik "TSOP6238 IR Receiver Modules for Infrared Remote Control Systems" dated Jan. 2004 1-pg.

Fisher et al., "Repetitive Motion Disorders: The Design of Optimal Rate- Rest Profiles," Human Factors, 35(2):283-304 (Jun. 1993).

Fukumoto, et al., "ActiveClick: Tactile Feedback for Touch Panels," In CHI 2001 Summary, pp. 121-122, 2001.

Fukumoto and Yoshinobu Tonomura, "Body Coupled Fingering: Wireless Wearable Keyboard," *CHI 97*, pp. 147-154 (Mar. 1997).

Hardy, "Fingerworks" Mar. 7, 2002; BBC World On Line.

Hillier and Gerald J. Lieberman, *Introduction to Operations Research* (1986).

International Search Report dated Mar. 3, 2006 (PCT/US 05/03325; 119-0052WO).

Jacob et al., "Integrality and Separability of Input Devices," *ACM Transactions on Computer-Human Interaction*, 1:3-26 (Mar. 1994).

Kinkley et al., "Touch-Sensing Input Devices," in CHI '99 Proceedings, pp. 223-230, 1999.

Kionx "KXP84 Series Summary Data Sheet" copyright 2005,dated Oct. 21, 2005, 4-pgs.

Lee et al., "A Multi-Touch Three Dimensional Touch-Sensitive Tablet," in CHI '85 Proceedings, pp. 121-128, 2000.

Lee, "A Fast Multiple-Touch-Sensitive Input Device," Master's Thesis, University of Toronto (1984).

Matsushita et al., "HoloWall: Designing a Finger, Hand, Body and Object Sensitive Wall," In Proceedings of UIST '97, Oct. 1997.

Quantum Resarch Group "QT510/ QWheel™ Touch Slider IC" copyright 2004-2005, 14-pgs.

Quek, "Unencumbered Gestural Interaction,"*IEEE Multimedia*, 3:36-47 (Winter 1996).

Radwin,"Activation Force and Travel Effects on Overexertion in Repetitive Key Tapping," *Human Factors*, 39(1): 130-140 (Mar. 1997).

Rekimoto "SmartSkin: An Infrasturction for Freehand Manipulation on Interactive Surfaces" CHI 2002, Apr. 20-25, 2002.

Rekimoto et al., "ToolStone: Effective Use of the Physical Manipulation Vocabularies of Input Devices," In Proc. of UIST 2000, 2000.

Rubine et al., "Programmable Finger-Tracking Instrument Controllers," *Computer Music Journal*, vol. 14, No. 1 (Spring 1990).

Rutledge et al., "Force-To-Motion Functions for Pointing," Human-Computer Interaction—INTERACT (1990).

Subatai Ahmad, "A Usable Real-Time 3D Hand Tracker," Proceedings of the 28th Asilomar Conference on Signals, Systems and Computers—Part 2 (of2), vol. 2, (Oct. 1994).

Texas Instruments "TSC2003 / I2C Touch Screen Controller" Data Sheet SBAS 162, dated Oct. 2001, 20-pgs.

Wellner, "The Digital Desk Calculators: Trangible Manipulation on a Desk Top Display" IN ACM UIST '91 Proceedings, pp. 27-34, Nov. 1991.

Williams, "Applications for a Switched-Capacitor Instrumentation Building Block" Linear Technology Application Note 3, Jul. 1985, pp. 1-16.

Yamada et al., "A Switched-Capacitor Interface for Capacitive Pressure Sensors" IEEE Transactions on Instrumentation and Measurement, vol. 41, No. 1, Feb. 1992, pp. 81-86.

Yeh et al., "Switched Capacitor Interface Circuit for Capacitive Transducers" 1985 IEEE.

Zhai et al., "Dual Stream Input for Pointing and Scrolling, " *Proceedings of CHI '97 Extended Abstracts* (1997).

Zimmerman et al., "Applying Electric Field Sensing to Human-Computer Interfaces," In CHI '85 Proceedings, pp. 280-287, 1995.

U.S. Appl. No. 10/774,053, filed Feb. 5, 2004.

U.S. Appl. No. 11/140,529, filed May 27, 2005 which is a Reissue of 6,570,557.

U.S. Appl. No. 11/381,313, filed May 2, 2006 entitled "Multipoint Touch Surface Controller".

U.S. Appl. No. 11/332,861, filed Jan. 13, 2006 which is a Reissue of 6,677,932.

U.S. Appl. No. 11/380,109, filed Apr. 25, 2006 entitled "Keystroke Tactility Arrangement On Smooth Touch Surface."

U.S. Appl. No. 11/428,501, filed Jul. 3, 2006 entitled "Capacitive Senaing Arrangement," which is a Continuation of US 2005/0104867.

U.S. Appl. No. 11/428,503, filed Jul. 3, 2006 entitled "Touch Surface" which is a Continuation of US 2005/0104867.

U.S. Appl. No. 11/428,506, filed Jul. 3, 2006 entitled "User Interface Gestures" which is a Continuation of US 2005/0104867.

U.S. Appl. No. 11/428,515, filed Jul. 3, 2006 entitled "User Interface Gestures" which is a Continuation of US 2005/0104867.

U.S. Appl. No. 11/428,522 filed Jul. 3, 2006 entitled "Identifying Contacts on a Touch Surface" which is a Continuation of US 2005/0104867.

U.S. Appl. No. 11/428,521, filed Jul. 3, 2006 entitled "Identifying Contacts on a Tonch Surface" which is a Continuation of US 2005/0104867.

U.S. Appl. No. 11/426,078, filed Jun. 23, 2006 entitled "Electronic Device Having Display and Surrounding Touch Sensitive Bezel for User Interface and Control" which is a Continuation-In-Part of 2006/0197753.

U.S. Appl. No. 11/278,080, filed Mar. 30, 2006 entitled "Force Imaging Input Device and System".

U.S. Appl. No. 11/382,402, filed May 9, 2006 entitled "Force and Location Sensitive Display" which is a Continuation of U.S. Appl. No. 11/278,080.

International Search Report received in corresponding PCT application No. PCT/US2006/008349 dated Oct. 6, 2006.

U.S. Appl. No. 10/654,108, filed Sep. 2, 2003 entitled "Ambidextrous Mouse".

U.S. Appl. No. 10/789,676, filed Feb. 27, 2004 entitled "Shape Detecting Input Device".

"4-Wire Resistive Touchscreens" obtained from http://www.touchscreens.com/intro-touchtypes-4resistive.html generated Aug. 5, 2005.

"5-Wire Resistive Touchscreens" obtained from http://www.touchscreens.com/intro-touchtypes-resistive.html generated Aug. 5, 2005.

"A Brief Overview of Gesture Recognition" obtained from http://www.dai.ed.ac.uk/Cvonline/LOCA_COPIES/COHEN/gesture_overview.html generated Apr. 20, 2004.

"Capacitive Touchscreens" obtained from http://www.touchscreens.com/intro-touchtypes-capacitive.html generated Aug. 5, 2005.

Jenna Wortham and Matt Richtel, Makers Hope Touch Screens Will Help Cellphone Sales, N.Y. Times, Dec. 1, 2008, at B1.

* cited by examiner

APPARATUS AND METHOD FOR INTERACTIVE DISPLAY WITH TACTILE FEEDBACK

RELATED APPLICATIONS

This application is a continuation-in-part of U.S. patent application Ser. No. 12/142,624, entitled Apparatus and Method for Interactive Display With Tactile Feedback, filed Jun. 19, 2008, the contents of which are incorporated herein by reference in their entirety.

FIELD OF THE INVENTION

The present invention relates to interactive displays for electronic devices, and in particular to an interactive display that provide tactile feedback to a user when the user applies pressure to the interactive display.

SUMMARY OF THE INVENTION

An electronic device according to an exemplary embodiment of the present invention comprises: an interactive display having an interactive mode and a non-interactive mode, the interactive display comprising: an image display device that displays a user-interactive imaged keypad in at least a portion of the image display device when the interactive display is in the interactive mode and that displays other image data in the at least a portion of the image display device when the interactive display is in the non-interactive mode; and a substantially transparent physical keypad that provides tactile feedback to a user indicating location of one or more imaged keys within the imaged keypad in response to one or more actuators disposed below the image display device.

In at least one embodiment, the image display device is structured so as to form a seal for the electronic device.

In at least one embodiment, the physical keypad comprises one or more physical keys corresponding to the imaged keys.

In at least one embodiment, the image display device and the physical keypad are integral to one another.

In at least one embodiment, the one or more physical keys are made of substantially transparent material so that the imaged keys may be viewed within the one or more physical keys.

In at least one embodiment, the imaged keypad comprises one or more sub-keypads, each of the one or more sub-keypads being selectively activated.

In at least one embodiment, one or more portions of the physical keypad are selectively activated to correspond to the one or more sub-keypads.

In at least one embodiment, the physical keypad provides tactile feedback only when the interactive display is in the interactive mode.

In at least one embodiment, the physical keypad comprises piezoelectric material.

In at least one embodiment, the piezoelectric material is quartz.

In at least one embodiment, the physical keypad is made of a magnetostrictive material.

In at least one embodiment, the image display device is selected from one of the following types of image display devices: liquid crystal displays, digital light processor displays, plasma displays and light emitting diode displays.

In at least one embodiment, the image display device is a touchscreen image display device.

In at least one embodiment, the physical keypad comprises physical keys that extend through corresponding openings in the touchscreen image display device.

In at least one embodiment, the one or more actuators move at least one of the physical keypad and the touchscreen display device relative to one another so that the one or more physical keys protrude through the openings in the touchscreen display device when the interactive display is in the interactive mode.

In at least one embodiment, one or more of the physical keys each comprise one or more magnetic elements.

In at least one embodiment, the touchscreen display device comprises one or more charged electrical circuit elements so that movement of the one or more physical keys comprising the one or more magnetic elements relative to the charged electrical circuits elements generate electricity.

In at least one embodiment, the electronic device further comprises a protective layer disposed between the physical keypad and the at least one magnetic actuator to prevent damage to the magnetic actuator resulting from contact with the physical keys.

In at least one embodiment, the electronic device is selected from one of the following types of electronic devices: cell phones, personal digital assistants, automatic teller machines and data input devices.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAILED DESCRIPTION OF THE PREFERRED EMBODIMENT(S)

The present invention is directed to an electronic device including an interactive display having an interactive mode in which a user-interactive keypad is displayed in at least a portion of the interactive display and a non-interactive mode in which other image data is displayed in the portion of the interactive display. The interactive display includes a substantially transparent keypad portion that provides tactile feedback to allow the user to locate individual keys within the keypad portion. The present invention is applicable to any electronic device having a touchscreen display, including, for example, personal digital assistants (PDAs), cell phones, automated teller machines (ATMs), computers (including laptop and desktop computers), gaming devices, television monitors, video conferencing equipment and any general data input device.

Figure 1A:
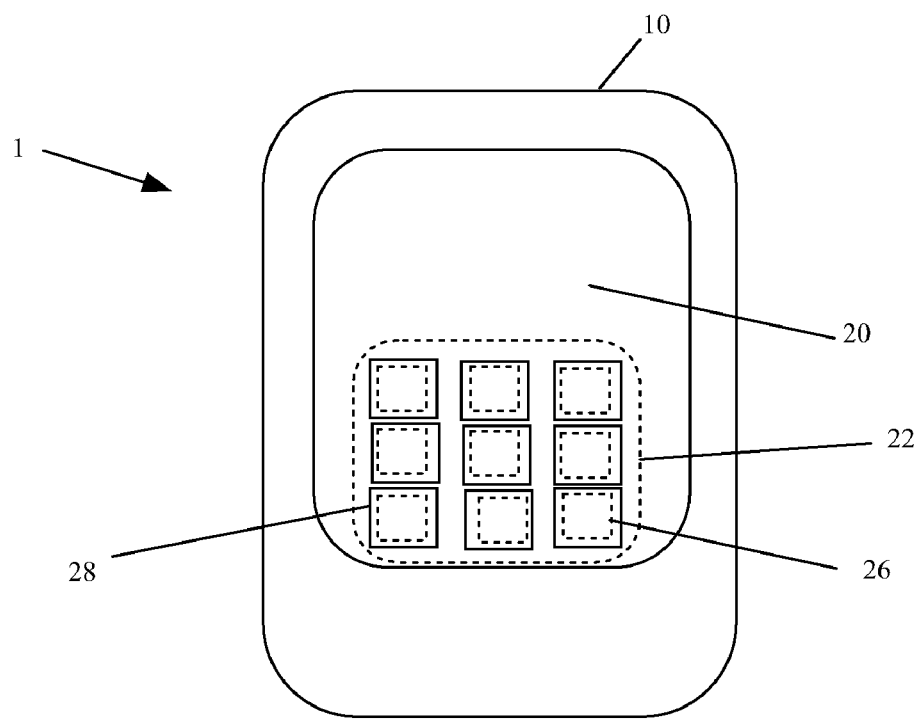
FIGS. 1A and 1B are front views of an electronic device according to an exemplary embodiment of the present invention.
Figure 1B:
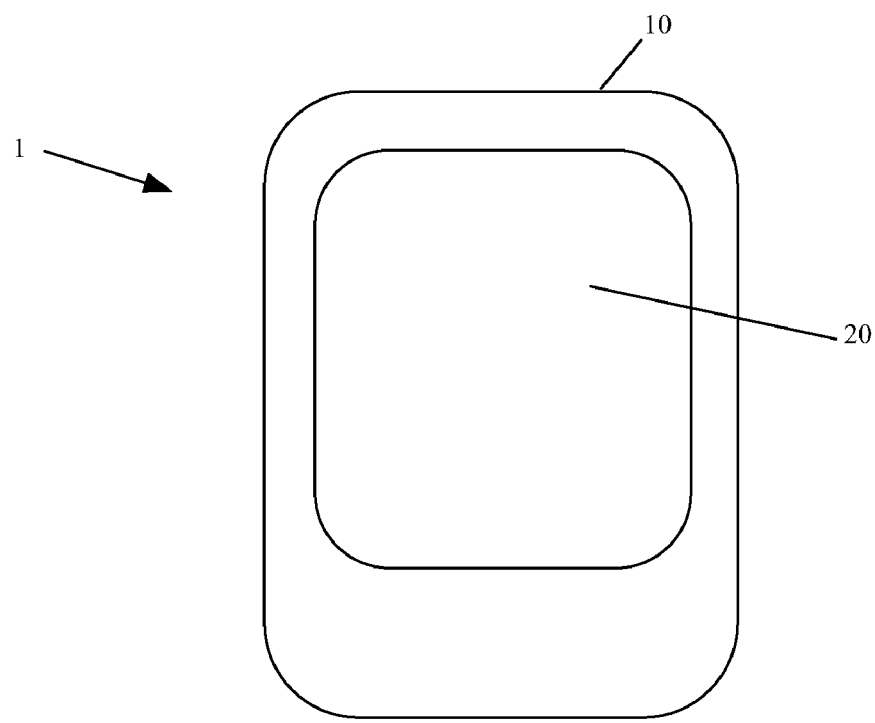

FIGS. 1A and 1B are front views of an electronic device, generally designated by reference number 1, according to an exemplary embodiment of the present invention. In the present embodiment, the electronic device 1 may be, for example, a PDA, cell phone, or other hand-held mobile device. The electronic device 1 includes a housing 10 and an interactive display 20. The housing 10 protects the internal electronic components of the electronic device 1, and clips or other similar elements may be disposed on the outside of the housing 10 to allow the electronic device to be attached to an object.

In FIG. 1A, the electronic device 1 is in an interactive mode. In this mode, an interactive keypad 22 is displayed within a portion of the interactive display 20. The interactive keypad 22 includes one or more imaged keys 26. Each imaged key 26 may be "pressed" by a user to input data to the electronic device 1 by applying physical pressure to the interactive display 20 over the imaged key 26. Such "touchscreen" technology is well known in the art, such as in U.S. Pat. Nos. 5,815,141, 6,297,811, and 5,784,054, the contents of which are incorporated herein by reference. One or more other images may be displayed in other portions of the interactive display 20. Also, in the interactive mode, the interactive display 20 includes physical keys 28, such as, for example, bumps, ridges, indented regions or any other type of physical alteration that provides tactile feedback to a user, that correspond with the imaged keys 26 within the interactive keypad 22.

In FIG. 1B, the electronic device 1 is in a non-interactive mode. In this mode, the interactive keypad 22 is not displayed within the interactive display 20 and one or more other images may fully occupy the interactive display 20. Also, in the non-interactive mode, the interactive display 20 may be automatically modified so as not to include the physical keys 28 (i.e., the interactive display 20 may be completely smooth). Alternatively, the physical keys 28 may be formed permanently within the interactive display 20. A switch (not shown) may be provided through the housing 10 to allow a user to alternate the electronic device 1 between the interactive mode and the non-interactive mode.

Figure 2:
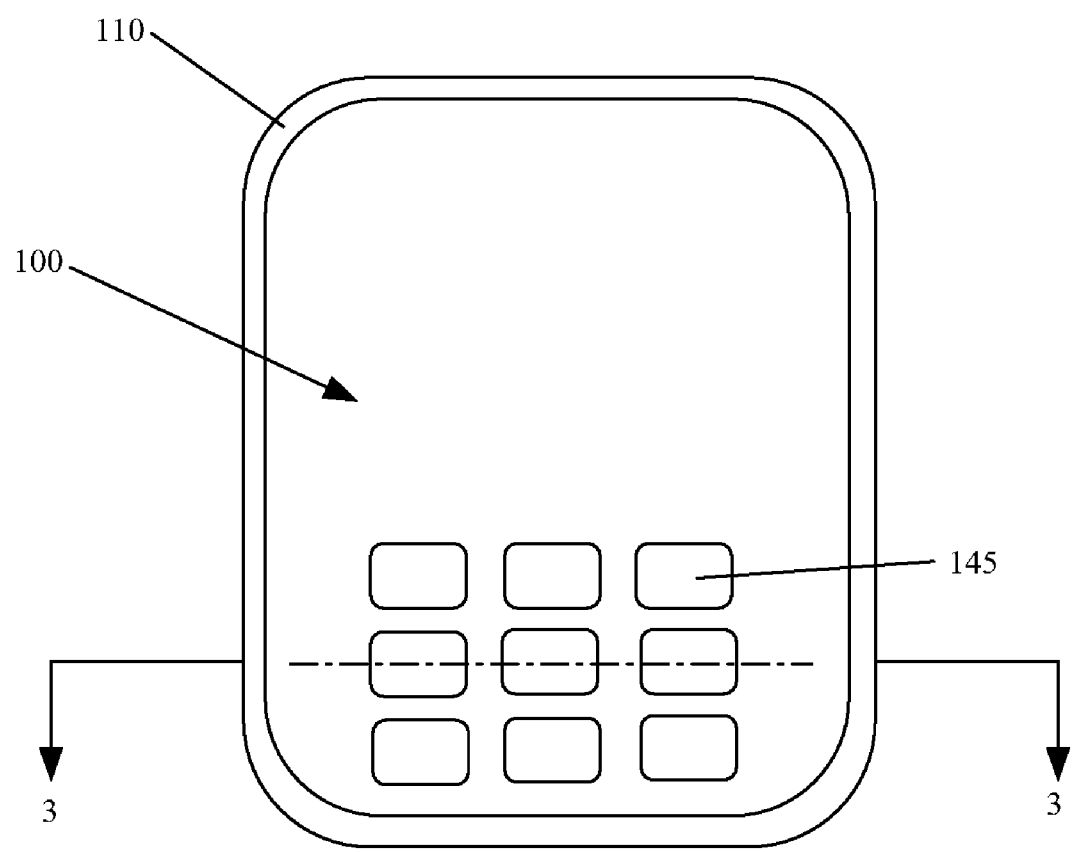
FIG. 2 is a plan view of an interactive display according to an exemplary embodiment of the present invention.

FIG. 2 is a plan view of an interactive display, generally designated by reference number 100, according to an exemplary embodiment of the present invention. The interactive display 100 is shown held within a frame element 110. The interactive display may include one or more physical keys 145. As explained in further detail below, the top surface of the physical keys 145 may be level with the top plane of the interactive display 100 when the interactive display 100 is in the non-interactive mode, and the top surface of the keys 145 may be moved outside the top plane of the interactive display 100 when the interactive display 100 is in the interactive mode so that bumps or protrusions are formed in the interactive display 100 that correspond with displayed imaged keys.

Figure 3A:
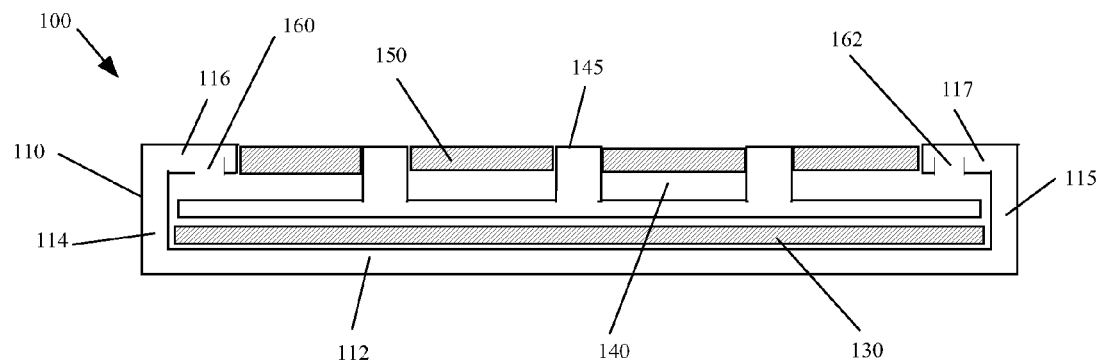
FIGS. 3A and 3B are cross-sectional views of an interactive display according to an exemplary embodiment of the present invention.
Figure 3B:
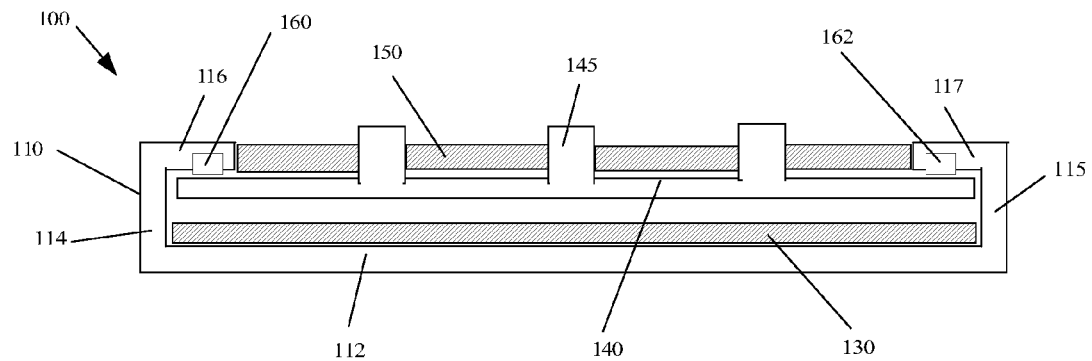

FIGS. 3A and 3B are cross-sectional views of the interactive display 100 taken along line 3-3 in FIG. 2. In FIG. 3A, the interactive display 100 is in the non-interactive mode, and in the FIG. 3B, the interactive display 100 is in the interactive mode. As shown in FIGS. 3A and 3B, the frame element 110 may include a bottom wall 112, side walls 114, 115 and top walls 116, 117. The interactive display 100 may be housed within the frame element 110 with the bottom surface of the interactive display 100 resting on the bottom wall 112 of the frame element 110. The interactive display 100 may include a display device 130, a physical keypad 140 including the physical keys 145 disposed over the display device 130, and a touchscreen panel 150 disposed over the physical keypad 140.

The display device 130 may be any suitable display device, such as, for example, a liquid crystal display (LCD), a digital light processing (DLP) display, a plasma display or a light-emitting diode (LED) display, to name a few. As is known in the art, the display device 130 may include programmable elements that emit and/or block light to generate images. In the present embodiment, the display device 130 may display an imaged keyboard when the interactive display 100 is in the interactive mode.

The physical keypad 140 is a generally flat sheet or plate. The physical keys 145 are formed on the top surface of the physical keypad 140, and extend upwards towards the touchscreen panel 150. The physical keypad 140 is preferably made of a transparent material, such as, for example, plastic or glass. Any number of physical keys 145 may be formed on the physical keypad 140. In an exemplary embodiment, the number and shape of the physical keys 145 are made to correspond to the number and shape of the imaged keys in the imaged keyboard displayed by the display device 130.

The touchcreen panel 150 may be a transparent panel that generates a programming signal when pressure is applied to one or more areas on the touchscreen panel 150. Various programming signals generated by the touchscreen panel 150 may be sent to the display device 130, resulting in formation or manipulation of images in the display device 130. For example, a user may apply pressure to the touchscreen panel 150 to activate the imaged keyboard and place the interactive display 100 in the interactive mode. Any suitable touchscreen technology may be used for the touchscreen panel 150, such as, for example, resistive touchscreens, surface acoustic wave touchscreens, capacitive touchscreens, infrared touchscreens, strain gauge touchscreens, optical imaging, dispersive signal technology, acoustic pulse recognition, total internal reflection, and diffused laser imaging, to name a few.

The touchscreen panel 150 may include a number of openings 152 that correspond with the physical keys 145 of the physical keypad 140. The physical keys 145 extend through the openings 152. When the interactive display 100 is in the non-interactive mode, the top surfaces of the physical keys 145 may be co-planar with the top surface of the touchscreen panel 150. When the interactive display 100 is in the interactive mode, the top surfaces of the physical keys 145 may be raised or lowered relative to the top surface of the touchscreen panel 150, so that the touchscreen panel 150 includes a number of protrusions or indentations that correspond to the imaged keys in the imaged keypad. Thus, when the interactive display 100 is in the interactive mode, a user is able to feel the location of the various imaged keys based on the tactile feedback provided by the protrusions or indentations in the touchscreen panel 150.

In an exemplary embodiment of the present invention, first and second actuators 160, 162, located on either side of the frame element 110, may be used to manipulate the physical keypad 140 and thereby raise and lower the physical keys 145 relative to the touchscreen panel 150. The first and second actuators 160, 162 may be any suitable actuators, such as, for example, mechanical actuators, such as springs, microelectromechanical devices (MEMS), piezoelectric actuators and magnetostrictive actuators, to name a few. It should be appreciated that the number of actuators is not limited to two, and any number of actuators located at any suitable position relative to the physical keypad 140 may be used to raise and lower the physical keypad 140. Alternatively, the actuators 160, 162 may be used to raise and lower the touchscreen panel 150 rather than the physical keypad 140.

Figure 4A:
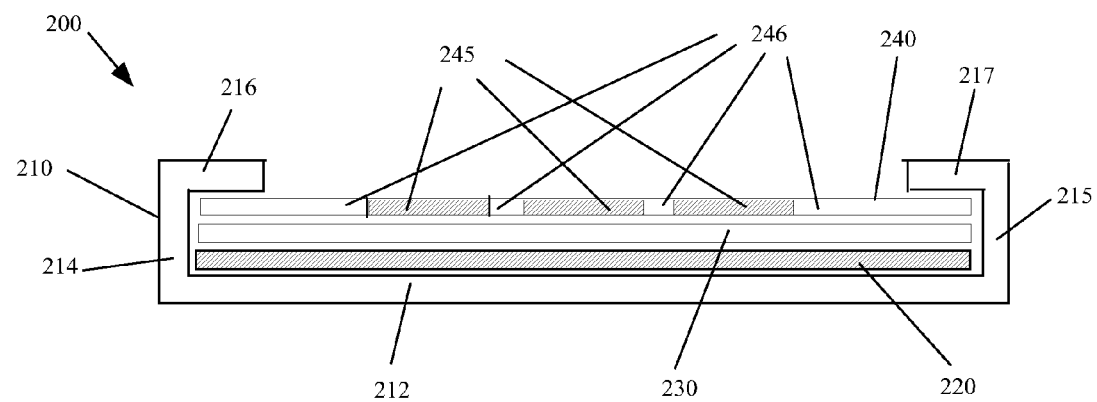
FIGS. 4A and 4B are cross-sectional views of an interactive display according to another exemplary embodiment of the present invention.
Figure 4B:
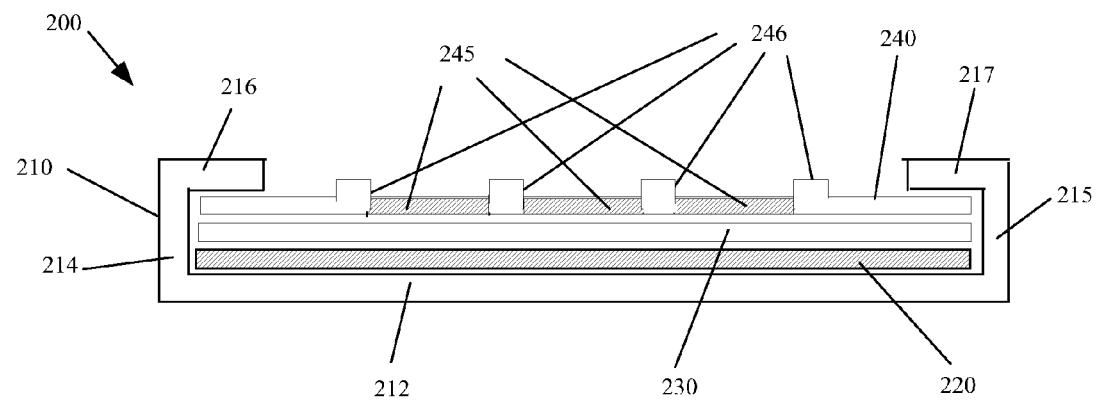

FIGS. 4A and 4B are cross sectional views of an interactive display, generally designated by reference number 200, according to another exemplary embodiment of the present invention. In FIG. 4A, the interactive display 200 is in the non-interactive mode, and in the FIG. 4B, the interactive display 200 is in the interactive mode. As in the previous embodiment, the interactive display 200 may be housed within a frame element 210 including a bottom wall 212, side walls 214, 215 and top walls 216, 217. The interactive display 200 may includes a display device 220, a touchscreen panel 230 disposed over the display device 220, and a physical keypad 240 disposed over the touchscreen panel 230. As in the previous embodiment, the display device 220 may be, for example, an LCD display, a DLP display, a plasma display or a LED display. The touchscreen panel 230 may use any of the touchscreen technology as described regarding the previous embodiment.

The physical keypad 240 in the present embodiment may include physical keys 245 defined by a material that changes shape under the influence of an electric or magnetic field. For example, the physical keys 245 may be made of a piezoelectric material, such as, for example, quartz, or a magnetostrictive material, such as, for example, ferromagnetic thin films. In the embodiment shown in FIGS. 4A and 4B, the physical keys 245 are defined by a grid structure 246 of piezoelectric material formed within the physical keypad 240. Thus, the grid structure 246 may either deflect downwards or upwards under the application of an electric field, thereby forming protrusions or indentations around the physical keys 245. In the embodiment shown in FIG. 4B, the grid structure 246 is structured so as to deflect upwards when an electric field is applied, thereby forming protrusions that define the physical keys 245. Thus, in the interactive mode, the user is able to feel the location of the physical keys 245. Deformation of the physical keys 245 in this embodiment may also result in generation of electricity, which may be fed back to the interactive display 200 as a power source.

It should be appreciated that the present invention is not limited to the above described embodiments. For example, in other exemplary embodiments, each physical key may be made of two or more pieces of transparent material that are made to deflect relative to one another when the interactive display is switched between the interactive and non-interactive modes so as to form appropriate protrusions or indentations in the interactive display that demark the physical keys. In such an embodiment, an additional transparent layer may be disposed over the physical keypad, so that when the two or more pieces of material that form the physical keys are deflected, smooth bumps or indentations are formed in the transparent layer.

Figure 5:
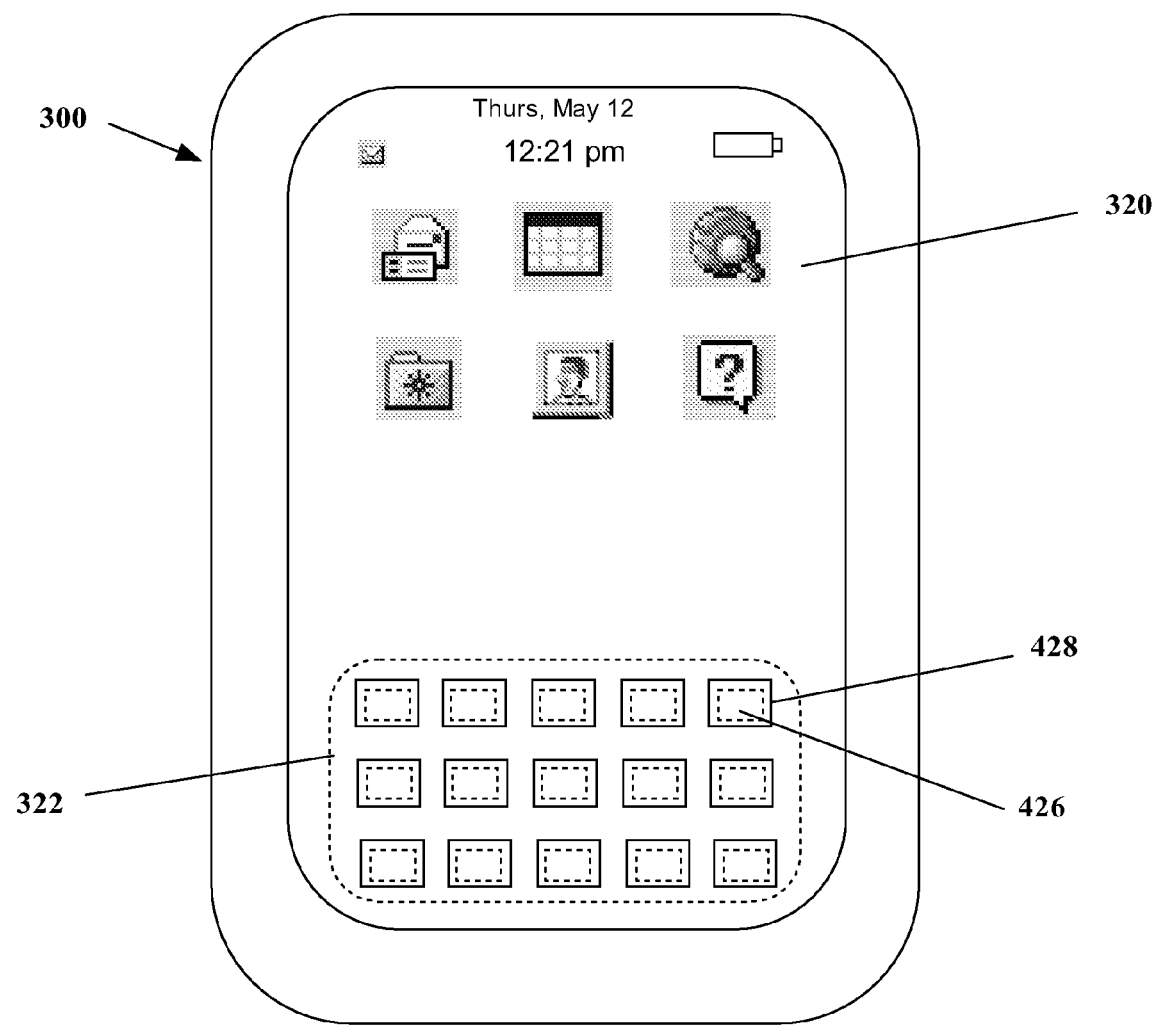
FIG. 5 is a plan view of an electronic device according to an exemplary embodiment of the present invention.
Figure 6A:
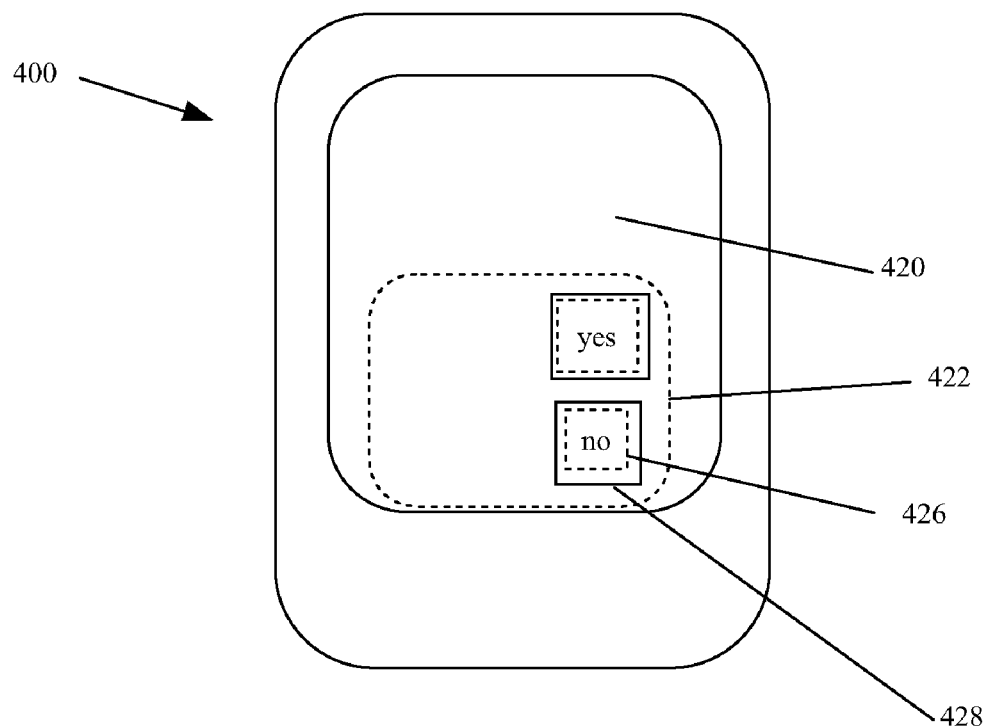
FIGS. 6A and 6B are plan views of an electronic device according to another exemplary embodiment of the present invention.
Figure 6B:
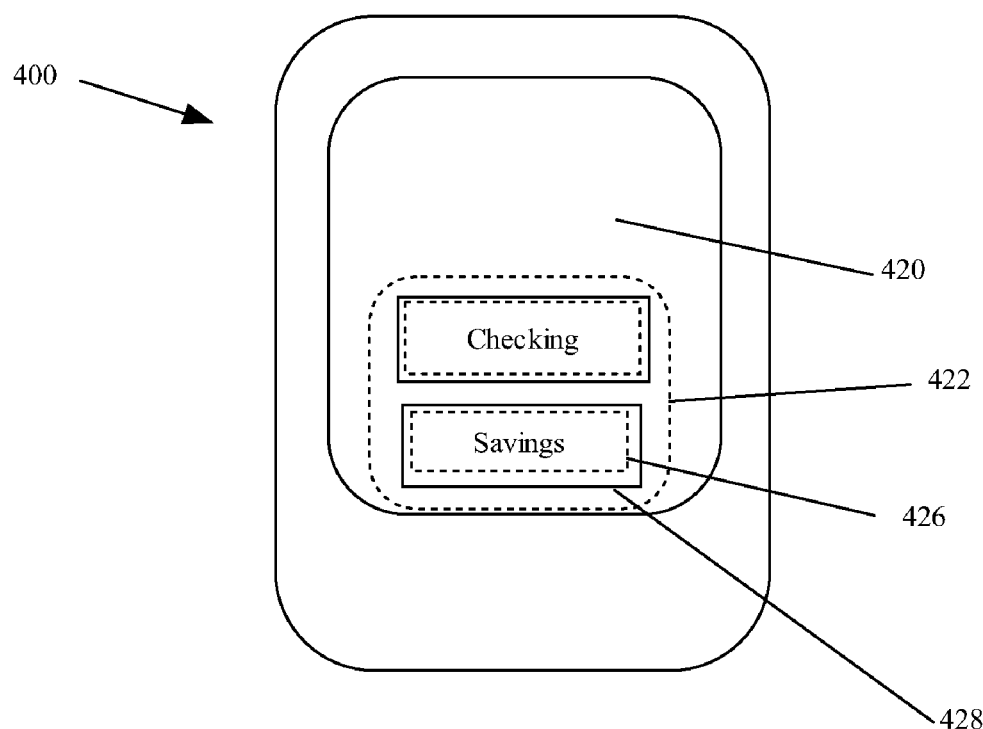

Further, as shown in FIGS. 5 and 6A-B, the interactive display of the present invention may include any number and shape of imaged and physical keys. In particular, in the embodiment shown in FIG. 5, an electronic device 300, such as a personal digital assistant, may include an interactive display 320 that provides a full keypad 322, including physical keys 328 corresponding with imaged keys 326, when in the interactive mode. In the embodiment shown in FIGS. 6A and 6B, an electronic device 400, such as an ATM, may include an interactive display 420 that provides a partial keypad 422, including physical keys 428 corresponding with imaged keys 426, when in the interactive mode. In the case of ATMs, the imaged keys 426 may be displayed in various shapes. For example, as shown in FIG. 6A, the electronic device 400 may display imaged keys 426 that are generally square shaped, while in FIG. 6B the electronic device 400 may display imaged keys 426 that are generally rectangular shaped. The physical keys 428 of the electronic device 400 may be made to mirror the different shapes of the imaged keys 426. In this regard, controlled magnetic and/or electric fields may be delivered to the physical keypad of the electronic device 400 to result in the appropriately shaped physical key 428.

In other exemplary embodiments of the present invention, the interactive display may include separate regions, where one or more regions are interactive and one or more other regions are not interactive. Further, the interactive display may be composed of more than one display, where one or more of the displays are interactive and one or more other displays are not interactive.

Figure 7:
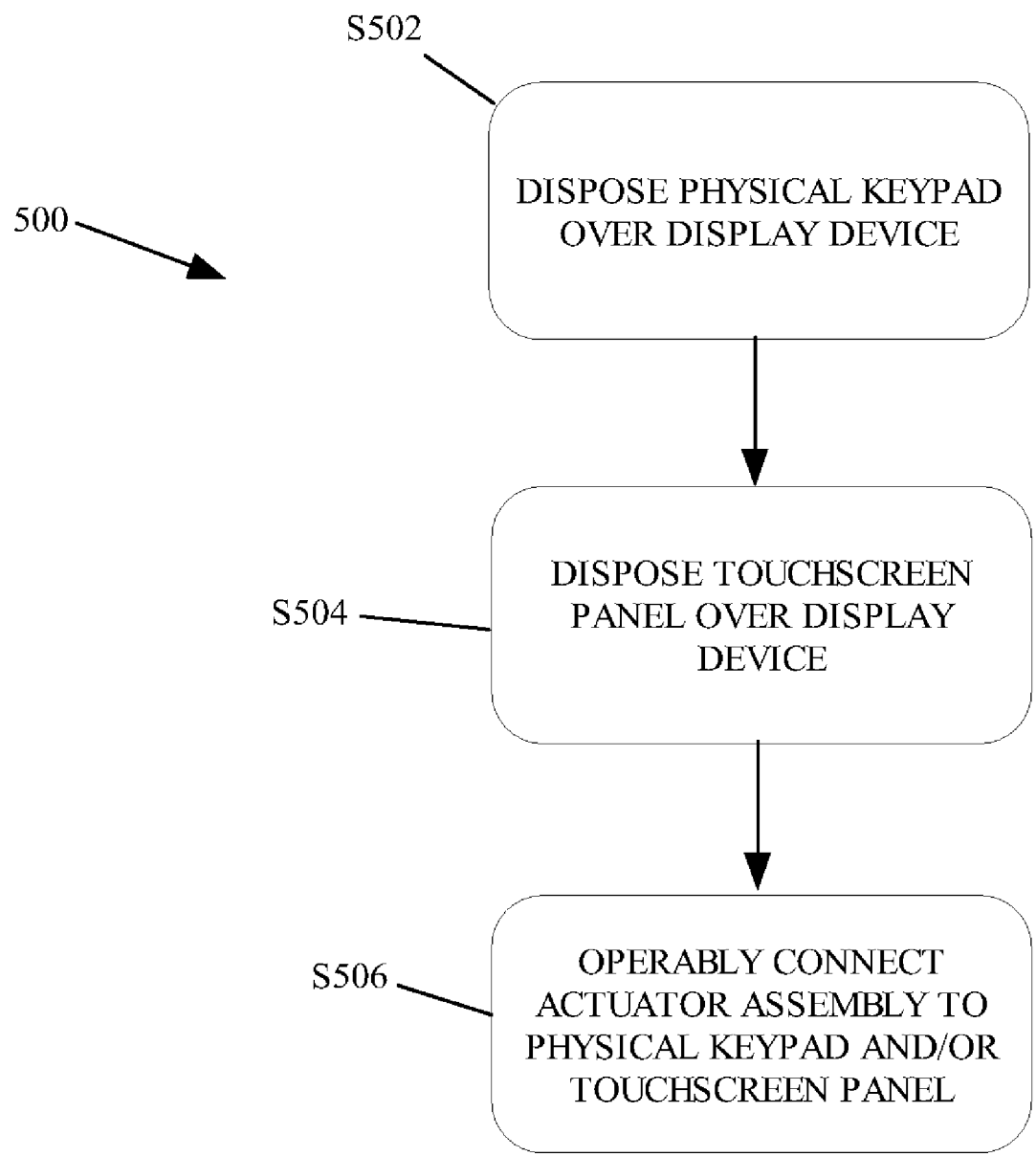
FIG. 7 is a flowchart showing a method of manufacturing an interactive display according to an exemplary embodiment of the present invention.

FIG. 7 is a flowchart showing a method, generally designated by reference number 500, of manufacturing an interactive display according to an exemplary embodiment of the present invention. In the present method, various layers of the interactive display may be disposed over one another and adhered to one another to provide a unitary structure. For example, one or more of the various layers may be laminated to one another. In step S502, a physical keypad having physical keys is disposed over a display device. The display device may be any suitable display device, such as, for example, an LCD display, a DLP display or a LED display, to name a few. The physical keypad may include, for example, permanent physical keys or be constructed of material that results in generation of temporary physical keys upon application of an electric or magnetic field to the physical keypad. In step S504, a touchscreen panel is disposed over the display device. The touchscreen panel may have one or more openings through which physical keys of the physical keypad may protrude. In step S506 an actuator assembly is operably attached to the physical keypad and/or the touchscreen panel. The actuator assembly may be controlled to deliver an appropriate magnetic or electric field to the physical keypad so as to generate temporary physical keys. Alternatively, the physical keypad and the touchscreen panel may be movable relative to one another through control of the actuator assembly, in which case the actuator assembly may include any suitable actuator that provides translation forces, such as, for example, springs, MEMS devices, and piezoelectric actuators, to name a few.

Figure 8:
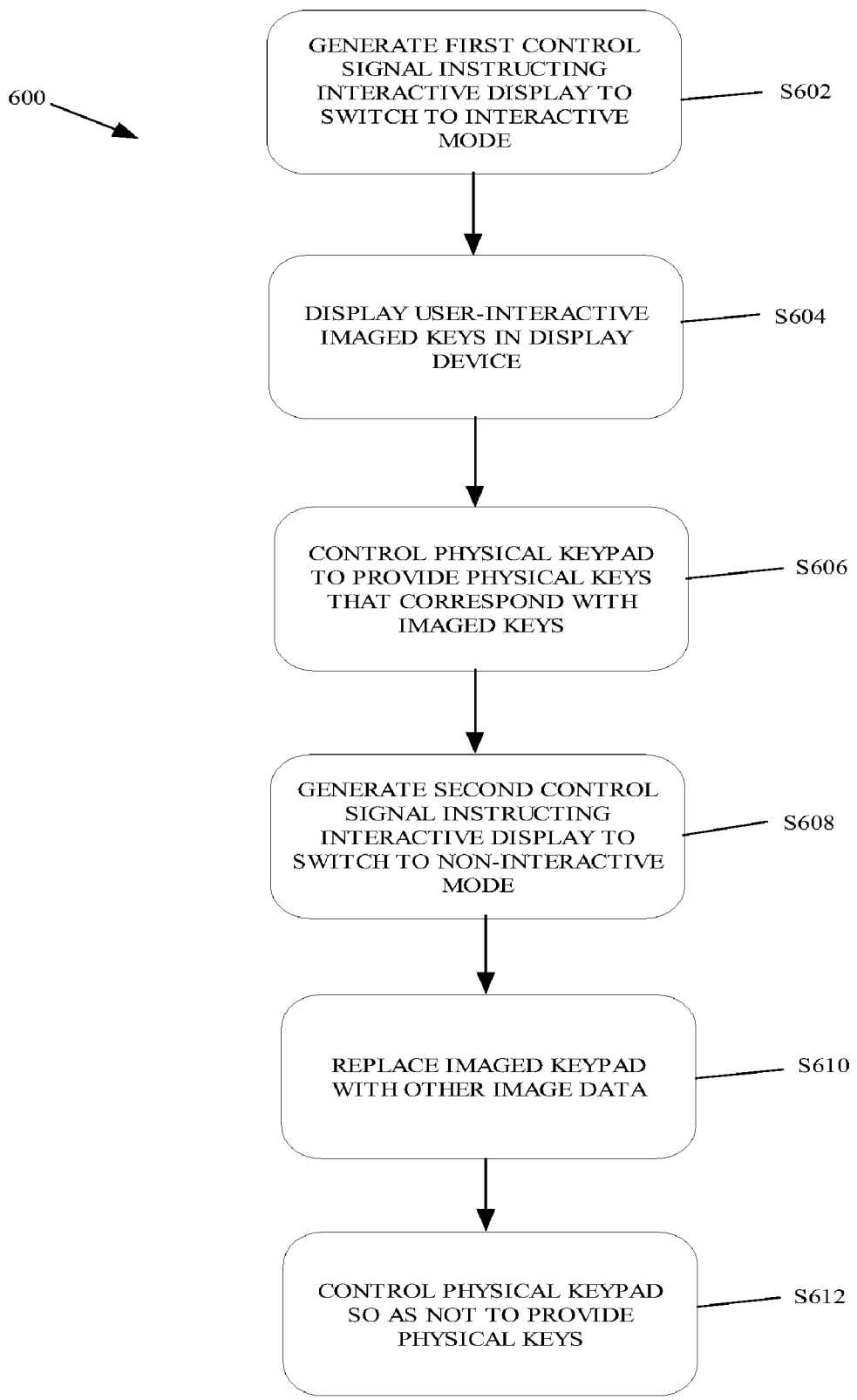
FIG. 8 is a flowchart showing a method of operation of an interactive display according to an exemplary embodiment of the present invention.

FIG. 8 is a flowchart showing a method of operation, generally designated by reference number 600, of an interactive display according to an exemplary embodiment of the present invention. In step S602, the interactive display generates a first control signal instructing the interactive display to switch into an interactive mode. In step S604, based on the second control signal, a display device of the interactive display displays user-interactive imaged keys of an imaged keypad. In step S606, based on the first control signal, a physical keypad of the interactive display is controlled to provide physical keys that correspond with the imaged keys of the imaged keypad. In step S608, the interactive display generates a second control signal instructing the interactive display to switch into a non-interactive mode. In step S610, based on the second control signal, the display device replaces the imaged keypad with other image data. In step S612, based on the second control signal, the physical keypad of the interactive display is controlled so as not to provide physical keys.

Figure 9:
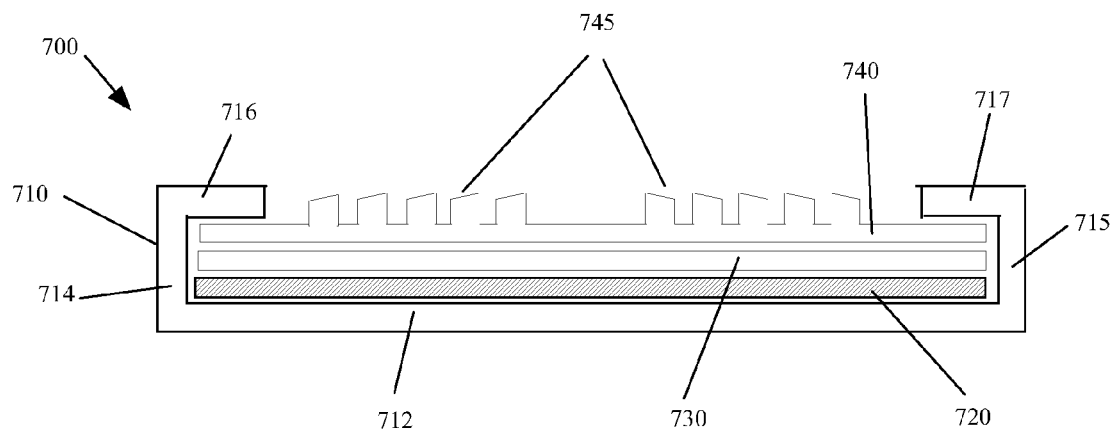
FIG. 9 is a cross-sectional view of an interactive display according to an exemplary embodiment of the present invention

FIG. 9 is a cross sectional views of an interactive display, generally designated by reference number 700, according to another exemplary embodiment of the present invention. As in the previous embodiment, the interactive display 700 may be housed within a frame element 710 including a bottom wall 712, side walls 714, 715 and top walls 716, 717. The interactive display 700 may includes a display device 720, a touchscreen panel 730 disposed over the display device 720, and a physical keypad 740 disposed over the touchscreen panel 730. As in the previous embodiment, the display device 720 may be, for example, an LCD display, a DLP display, a plasma display or a LED display. The touchscreen panel 730 may use any of the touchscreen technology as described regarding the previous embodiment.

The physical keypad 740 in the present embodiment may include physical keys 245. The physical keys 745 are preferably transparent and may be integrally formed with the remaining portions of the physical keypad 740 by a molding operation. In the exemplary embodiment shown in FIG. 9, the physical keys 245 protrude outwards away from the display device 720. However, in other exemplary embodiments, the physical keys 245 may protrude inwards towards the display device 720.

As shown in FIG. 9, the physical keys 745 on the right side of the physical keypad 740 may include top surfaces that are inclined towards the right, and the physical keys 745 on the left side of the physical keypad 740 may include top surfaces that are inclined towards the left. This arrangement prevents a user's finger from sliding off a physical key 745 onto an adjacent physical key 745. There may also be additional space provided between the left side physical keys 745 and right side physical keys 745 to allow for better viewing of the image when the interactive display 700 is in the non-interactive mode.

Figure 10:
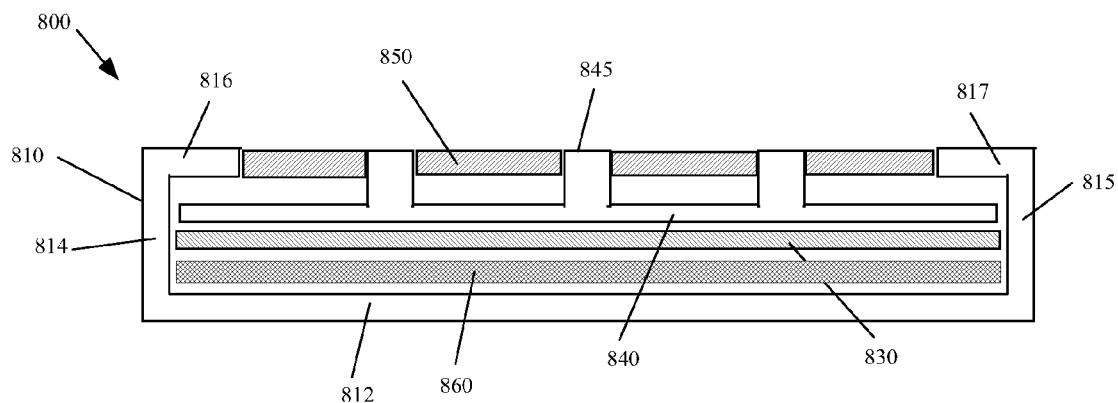
FIG. 10 is a cross-sectional view of an interactive display according to an exemplary embodiment of the present invention.

FIG. 10 is a cross sectional views of an interactive display, generally designated by reference number 800, according to another exemplary embodiment of the present invention. As in the previous embodiments, the interactive display 800 may be housed within a frame element 810 including a bottom wall 812, side walls 814, 815 and top walls 816, 817. The interactive display 800 may includes a display device 830, a physical keypad 840 disposed over the display device 830, and a touchscreen panel 850 disposed over the physical keypad 840. The physical keys 845 of the physical keypad 840 may protrude through openings in the touchscreen panel 850 when the interactive display 800 is in the interactive mode. As in the previous embodiments, the display device 830 may be, for example, an LCD display, a DLP display, a plasma display or a LED display. The touchscreen panel 850 may use any of the touchscreen technology as described regarding the previous embodiments.

In the present embodiment, an actuator element 860 is disposed below the display device 830. The actuator element 860 may be any type of suitable actuator, such as, for example, piezoelectric actuators or magnetostrictive actuators. It should be appreciated that the number of actuators is not limited to one, and any number of actuators located at any suitable position relative to the physical keypad 840 may be used to raise and lower the physical keypad 845. Alternatively, the actuator element 860 may be used to raise and lower the touchscreen panel 850 rather than the physical keypad 840. The structure of the present embodiment allows the display device 830 to be sealed with the frame element 810 so as to protect the actuator element 860 and other internal components from being damaged.

Figure 11:
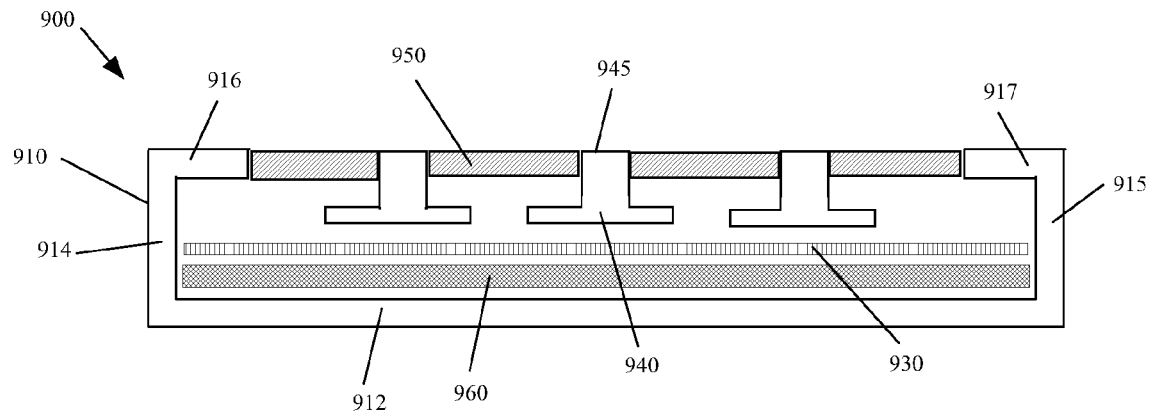
FIG. 11 is a cross-sectional view of an interactive display according to an exemplary embodiment of the present invention.

FIG. 11 is a cross sectional views of an interactive display, generally designated by reference number 900, according to another exemplary embodiment of the present invention. As in the previous embodiments, the interactive display 900 may be housed within a frame element 910 including a bottom wall 912, side walls 914, 915 and top walls 916, 917. The interactive display 900 may include an actuator element 960, a protective layer 930 disposed over the actuator element 960, one or more sub-keypads 940 disposed over the protective layer 930, and a touchscreen display device 950 disposed over the sub-keypads 940. The use of the touchscreen display device 950 eliminates the need for a separate touchscreen panel, as in previous embodiments. The sub-keypads 940 may be individually operated by the actuator element 960, so that different ones of the physical keys 940 may be made to protrude through openings in the touchscreen display device 950. Thus, as an example, different physical keys 940 may provide tactile feedback to a user depending on the functional mode of the interactive display 900. Although each sub-keypad 940 is shown in FIG. 11 having only one physical key 945, it should be appreciated that each sub-keypad 940 may have any number of physical keys 945.

The protective layer 930 is disposed between the sub-keypads 940 and the actuator element 960 so as to prevent damage to the actuator element 960 that may otherwise result from contact with the sub-keypads 940. The protective layer 930 may be made of any suitable protective material that does not interfere with the function of the actuator element 960, such as, for example, felt, cotton, plastic, insulators, cushioning material, etc. The protective material can even be air in one embodiment.

FIG. 11 is a cross sectional views of an interactive display, generally designated by reference number 1000, according to another exemplary embodiment of the present invention. As in the previous embodiments, the interactive display 1000 may be housed within a frame element 1010 including a bottom wall 1012, side walls 1014, 1015 and top walls 1016, 1017. The interactive display 1000 may include an actuator element 1060, a physical keypad 1040 disposed over the actuator element 1060, and a touchscreen display device 1030 disposed over the physical keypad 1040. As in the previous embodiment, the physical keypad 1040 may be made up of separate sub-keypads (not shown). Further, a protective layer (not shown) may be disposed between the physical keypad 1040 and the actuator element 1060.

In the present embodiment, each key 1045 of the physical keypad 1040 forms part of the touchscreen display device 1030. In this regard, a touchscreen display element 1048 may be disposed within each key 1045, so that images, such as corresponding imaged keys, may be displayed on each key 1045 as part of the overall image displayed by the touchscreen display device 1030.

Figure 12A:
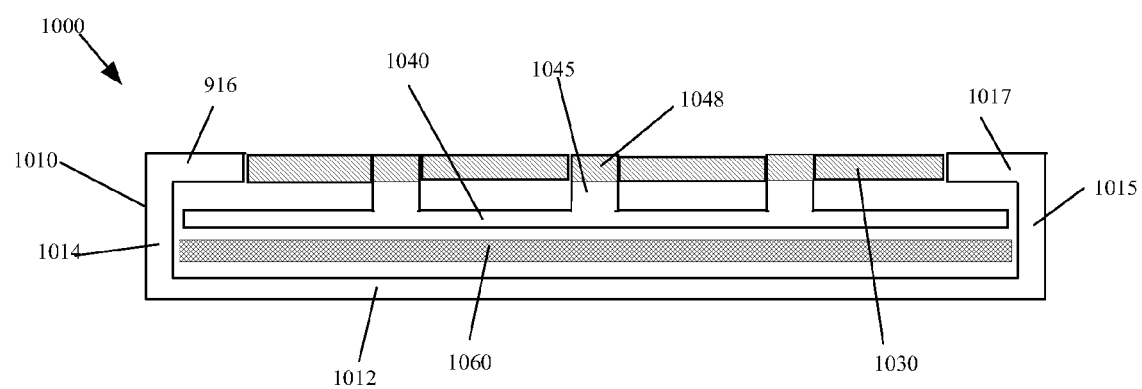
FIG. 12A is a cross-sectional view of an interactive display according to an exemplary embodiment of the present invention.
Figure 12B:
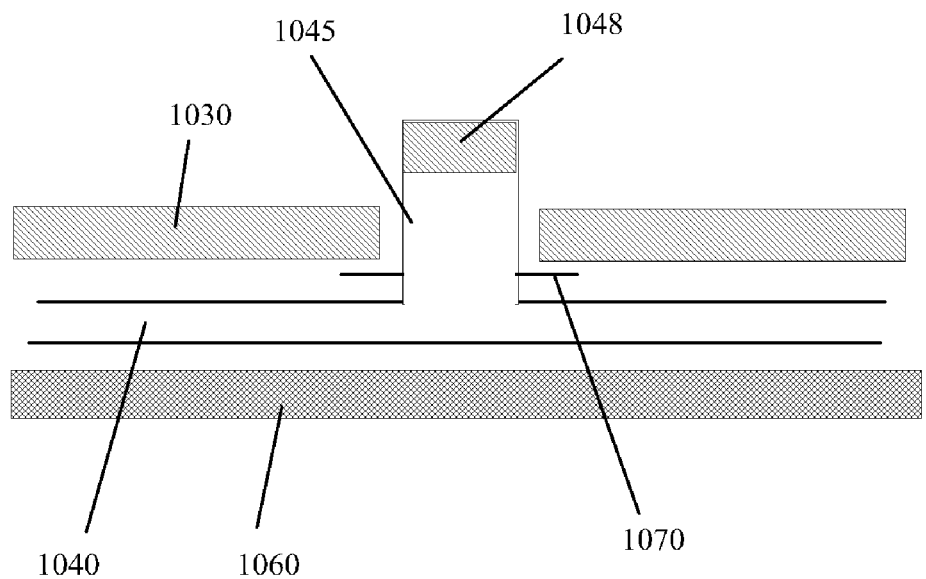
FIG. 12B is a detailed cross-sectional view of a section of the interactive display shown in FIG. 12A.

FIG. 12B is a detailed cross-sectional view of a section of the interactive display 1000. As shown in this figure, a connective element 1070 may be disposed at the base of each key 1045 so as to provide for delivery of appropriate signals to the key 1045 to display an image within the corresponding touchscreen display element 1048.

Figure 13:
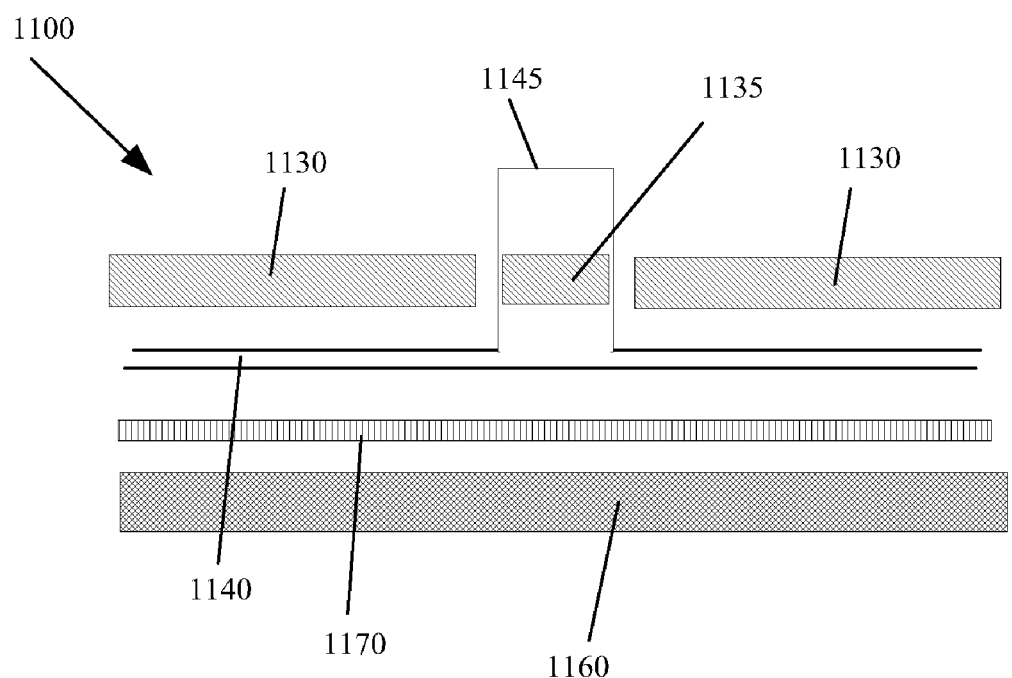
FIG. 13 is a cross-sectional view of an interactive display according to an exemplary embodiment of the present invention.

FIG. 13 is a cross-sectional view of a section of an interactive display, generally designated by reference number 1100, accordingly to another exemplary embodiment of the present invention. As in previous embodiment, the interactive display 1100 may be disposed within a frame element (not shown). The interactive display 1100 includes an actuator element 1160, a protective layer 1170 disposed over the actuator element 1160, a physical keypad 1140 disposed over the protective layer 1170 and a touchscreen display device 1130 disposed over the physical keypad 1140. A portion 1135 of the touchscreen display device 1130 may be disposed within each key 1145 of the physical keypad 1140. In this regard, the keys 1145 of the physical keypad 1140 may be substantially transparent, so that the portions 1135 of the touchscreen display device 1130 may be viewed through the top of each key 1145.

Figure 14:
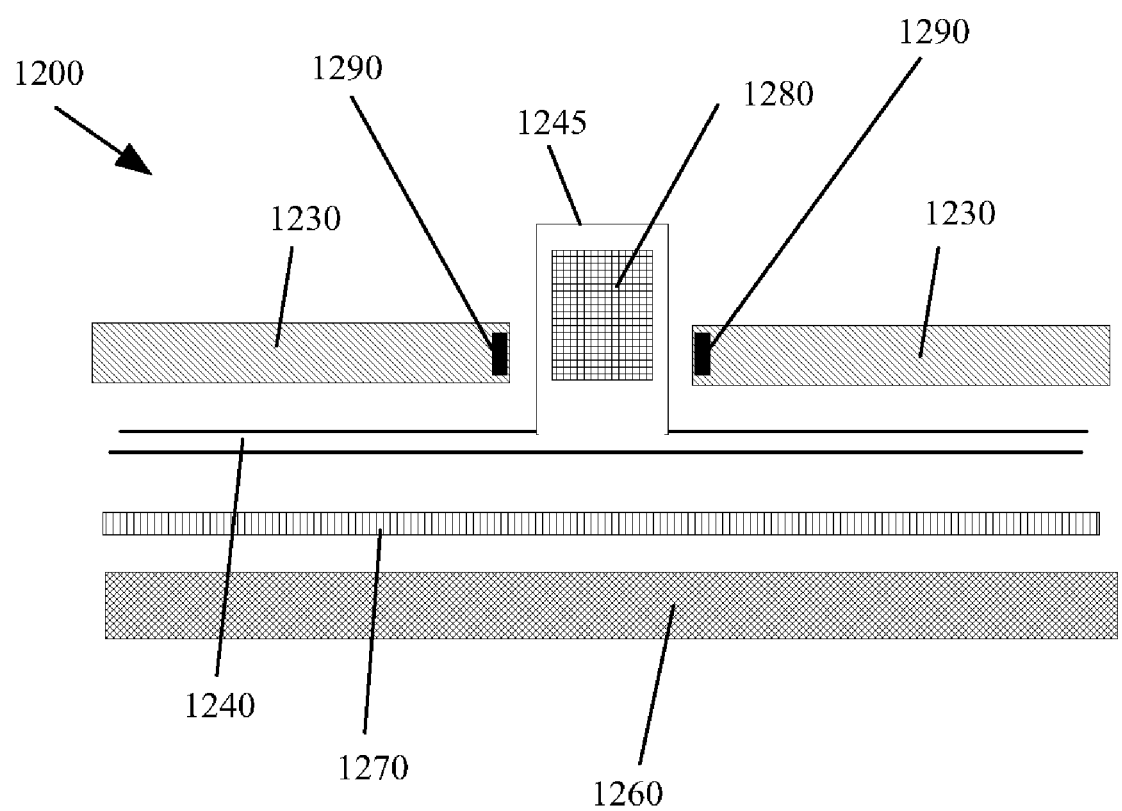
FIG. 14 is a cross-sectional view of an interactive display according to an exemplary embodiment of the present invention.

FIG. 14 is a cross-sectional view of a section of an interactive display, generally designated by reference number 1200, accordingly to another exemplary embodiment of the present invention. As in the previous embodiment, the interactive display 1200 may be disposed within a frame element (not shown). The interactive display 1200 includes an actuator element 1260, a protective layer 1270 disposed over the actuator element 1260, a physical keypad 1240 disposed over the protective layer 1270 and a touchscreen display device 1230 disposed over the physical keypad 1240. A permanent magnet 1280 is disposed within each key 1245 of the keypad 1240. One or more charged electrical circuit elements 1290 may be disposed within the touchscreen display device 1230 adjacent each key 1245. Movement of the key 1245, and hence the permanent magnet 1280, within a corresponding opening within the touchscreen display device 1230 relative to the charged electrical circuit elements 1290 results in generation of electricity. The generated electricity may be fed back to the interactive display 1200 as a power source.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. An electronic device comprising:
    an interactive display having an interactive mode and a non-interactive mode, the interactive display comprising:
        touchscreen image display device that displays a user-interactive imaged keypad in at least a portion of the image display device when the interactive display is in the interactive mode and that displays other image data in the at least a portion of the image display device when the interactive display is in the non-interactive mode; and
        a substantially transparent physical keypad that provides tactile feedback to a user indicating location of one or more imaged keys within the imaged keypad in response to one or more actuators disposed below the touchscreen image display device, the physical keypad comprising physical keys that extend through corresponding openings in the touchscreen image display device, one or more of the physical keys each comprising one or more magnetic elements, the one or more actuators moving at least one of the physical keypad and the touchscreen display device relative to one another so that the one or more physical keys protrude through the openings in the touchscreen display device when the interactive display is in the interactive mode, the touchscreen display device comprising one or more charged electrical circuit elements so that movement of the one or more physical keys comprising the one or more magnetic elements relative to the charged electrical circuit elements generates electricity.

2. The electronic device of claim 1, wherein the touchscreen image display device is structured so as to form a seal for the electronic device.

3. The electronic device of claim 1, wherein the physical keypad comprises one or more physical keys corresponding to the imaged keys.

4. The electronic device of claim 3, wherein the touchscreen image display device and the physical keypad are integral to one another.

5. The electronic device of claim 4, wherein the one or more physical keys are made of substantially transparent material so that the imaged keys may be viewed within the one or more physical keys.

6. The electronic device of claim 1, wherein the imaged keypad comprises one or more sub-keypads, each of the one or more sub-keypads being selectively activated.

7. The electronic device of claim 6, wherein one or more portions of the physical keypad are selectively activated to correspond to the one or more sub-keypads.

8. The electronic device of claim 1, wherein the physical keypad provides tactile feedback only when the interactive display is in the interactive mode.

9. The electronic device of claim 8, wherein the physical keypad comprises piezoelectric material.

10. The electronic device of claim 9, wherein the piezoelectric material is quartz.

11. The electronic device of claim 8, wherein the physical keypad is made of a magnetostrictive material.

12. The electronic device of claim 1, wherein the touchscreen image display device is selected from one of the following types of image display devices: liquid crystal displays, digital light processor displays, plasma displays and light emitting diode displays.

13. The electronic device of claim 1, further comprising a protective layer disposed between the physical keypad and the one or more actuators to prevent damage to the one or more actuators resulting from contact with the physical keys.

14. The electronic device of claim 1, wherein the electronic device is selected from one of the following types of electronic devices: cell phones, personal digital assistants, automatic teller machines and data input devices.

\* \* \* \* \*